(12) United States Patent
Chessel et al.

(10) Patent No.: US 9,650,122 B2
(45) Date of Patent: May 16, 2017

(54) BALLOON COMPRISING PHOTOVOLTAIC MEANS AND A SOLAR CONCENTRATION DEVICE

(71) Applicant: Thales, Neuilly-sur-Seine (FR)

(72) Inventors: Jean-Philippe Chessel, Mandelieu (FR); Jean-Pierre Prost, Opio (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 13/683,856

(22) Filed: Nov. 21, 2012

(65) Prior Publication Data

US 2013/0126668 A1    May 23, 2013

(30) Foreign Application Priority Data

Nov. 22, 2011    (FR) ...................................... 11 03552

(51) Int. Cl.
*B64B 1/14* (2006.01)
*B64B 1/40* (2006.01)

(52) U.S. Cl.
CPC .................. *B64B 1/40* (2013.01); *B64B 1/14* (2013.01); *Y02E 10/52* (2013.01)

(58) Field of Classification Search
CPC ....................................................... H02S 10/00
USPC ...... 244/58, 59, 96–99, 172.7, 172.8, 158.3, 244/125–128, 24–30, 31–33; 136/292
See application file for complete search history.

(56) References Cited

U.S. PATENT DOCUMENTS

| | | | |
|---|---|---|---|
| 3,153,878 A * | 10/1964 | Smith, Jr. | 244/31 |
| 3,565,368 A * | 2/1971 | Byron et al. | 244/31 |
| 4,174,082 A | 11/1979 | Eshoo | |
| 4,262,864 A | 4/1981 | Eshoo | |
| 4,438,760 A * | 3/1984 | Radebold | F24J 2/12 244/53 R |
| 4,534,525 A | 8/1985 | Bliamptis | |
| 2008/0264952 A1* | 10/2008 | Chu | B64B 1/14 220/562 |
| 2009/0189015 A1* | 7/2009 | Alavi | 244/126 |
| 2010/0043778 A1* | 2/2010 | Penciu | F24J 2/067 126/625 |
| 2010/0218806 A1* | 9/2010 | Arab et al. | 136/246 |
| 2010/0229850 A1 | 9/2010 | Sankrithi | |
| 2012/0097211 A1* | 4/2012 | Gurfil et al. | 244/33 |

FOREIGN PATENT DOCUMENTS

| | | |
|---|---|---|
| JP | H05-221387 A | 8/1993 |
| JP | H08-306218 A | 11/1996 |
| WO | 2011/117619 A2 | 9/2011 |

OTHER PUBLICATIONS

Cubic, "Changing the shape of SATCOM with the GATR 2.4m Satellite Antenna" 2016.*

* cited by examiner

*Primary Examiner* — Tien Dinh
*Assistant Examiner* — Richard R Green
(74) *Attorney, Agent, or Firm* — Baker & Hostetler, LLP

(57) ABSTRACT

A balloon equipped with photovoltaic means exhibiting an active face intended to receive solar rays and comprising an envelope, characterized in that the envelope comprises at least: a first zone transparent to solar rays; a second reflecting zone for said solar rays; a third zone comprising said photovoltaic means, the active face of which is directed toward the inside of said envelope; the second and third zones being positioned and cooperating in such a way as to reflect the solar rays in the direction of said third zone.

7 Claims, 2 Drawing Sheets

BALLOON COMPRISING PHOTOVOLTAIC MEANS AND A SOLAR CONCENTRATION DEVICE

CROSS-REFERENCE TO RELATED APPLICATION

This application claims priority to foreign French patent application No. FR 1103552, filed on Nov. 22, 2011, the disclosure of which is incorporated by reference in its entirety.

FIELD OF THE INVENTION

The field of the invention is that of balloons and notably stratospheric balloons. Generally, balloons exhibit high application potential not only due to their low cost compared to that of ground-based antennas or that of satellites, but also due to the altitudes at which they can work. The stratosphere is inaccessible to satellites and is traversed too rapidly by sounding rockets. Balloons, or aerostats in scientific terminology, can move for a long duration in this "middle" layer of the atmosphere, extending between 12 and 45 km in altitude, making them particularly promising in respect of responding to a range of applications and notably in the field of telecommunications.

BACKGROUND

Historically, balloons have been used to study the atmosphere and astronomy. The development of space activities has enabled their field of application to be broadened; today many balloon flights have a technological purpose, for example testing instruments intended to be placed on board satellites.

However, there are two problems to address in general for this kind of balloon:
- on the one hand there is a problem of lift, solved by an appropriate envelope volume;
- on the other hand there is a problem of propulsion to drive the balloon, which requires recourse to a power source, in general electrical, provided by photovoltaic cells from solar energy.

Generally, for a guided stratospheric balloon to be autonomous when station-keeping over a duration of several months, it must produce its energy with the aid of photovoltaic cells. Under stratospheric wind conditions, typically greater than 10 m/s, and for a continuous mission, the electrical energy produced during daytime is stored in order to be used at nighttime. The production of daytime electricity rapidly reaches several tens of kilowatts, i.e. several hundreds of $m^2$ of photovoltaic cells, and therefore several hundreds of kilograms. The weight assessment is a major factor for the feasibility of a stratospheric balloon, since the higher the weight to be carried, the greater the size of the balloon, the greater its wind resistance and the more the electrical energy required to power the motors which, when station-keeping, counter the wind to maintain the on-station position of the balloon.

The current solutions lead to covering the upper surface of the balloon with photovoltaic cells, with an unfavourable weight assessment as illustrated in FIG. 1 which schematically shows a balloon of the prior art comprising over a large surface area photovoltaic cells PV capable of picking up solar rays R in order to convert them into electrical energy.

There is notably known from document US 2010/0229850 a solution proposing a balloon equipped with photovoltaic means exhibiting an active face intended to receive solar rays and comprising an envelope comprising a zone transparent to solar rays and a zone including said photovoltaic means, the active face of which is directed toward the inside of said envelope.

SUMMARY OF THE INVENTION

In this context, the present invention proposes a solution in which the solar energy received by the balloon is concentrated over a smaller surface in order to reduce the number of photovoltaic cells needed to generate a given quantity of electrical energy, thus providing for lightening the weight of the whole assembly.

More specifically, a subject of the present invention is a balloon equipped with photovoltaic means exhibiting an active face intended to receive solar rays and comprising an envelope, characterized in that the envelope comprises at least:
- a first zone transparent to solar rays;
- a second reflecting zone for said solar rays;
- a third zone comprising said photovoltaic means, the active face of which is directed toward the inside of said envelope;
- the second and third zones being positioned and cooperating in such a way as to reflect the solar rays in the direction of said third zone.

According to one variant of the invention, the photovoltaic means are photovoltaic panels.

According to one variant of the invention, the balloon comprises a first reflecting zone and a second reflecting zone, said first reflecting zone reflecting the solar rays in the direction of said second reflecting zone and said second reflecting zone and said third zone being positioned to cooperate in such a way as to reflect the solar rays in the direction of said third zone.

According to one variant of the invention, the photovoltaic means are positioned on the outside of the envelope, the third zone being at least partially transparent to solar rays. Advantageously, the balloon can additionally comprise a sub-envelope located at said third zone, enabling said third zone to be protected from the concentrated reflected radiation of solar rays.

According to one variant of the invention, the photovoltaic means are positioned on the inside of the envelope.

According to one variant of the invention, the photovoltaic means are positioned in an opening made in the envelope.

According to one variant of the invention, the reflecting zone exhibits a shape suitable for concentrating the solar rays in the direction of said third zone.

According to one variant of the invention, the envelope exhibits a parabolic shape.

According to one variant of the invention, the reflecting zone exhibits a parabolic surface.

According to one variant of the invention, the shape of the envelope can be adapted to optimize lift.

According to one variant of the invention, the envelope comprises a first skin and a second skin comprising the reflecting zone on the inside of the envelope.

According to one variant of the invention, the shape of the first skin of the envelope and the shape of the second skin of the envelope comprising the reflecting zone are different, the shape of the first skin of the envelope being optimized for lift, the shape of the second skin of the envelope being optimized for concentrating solar rays.

BRIEF DESCRIPTION OF THE DRAWINGS

The invention will be better understood and other advantages will become apparent on reading the following description given in a non-limiting way and with reference to the accompanying drawings in which.

DETAILED DESCRIPTION

The present invention will be described hereafter in the context of a stratospheric balloon, but it could also be applied to any type of balloon. Generally, a stratospheric balloon comprises a pressurized envelope inflated with helium. In the context of the invention, said envelope comprises at least a first transparent zone to let the solar rays pass, a second reflecting zone to reflect the rays toward a third zone comprising means formed by photovoltaic cells oriented in such a way that their active detection faces are directed toward the inside of the balloon.

The shape of the reflecting surface can be adapted so as to concentrate the solar rays onto said photovoltaic cells.

Figure 1:
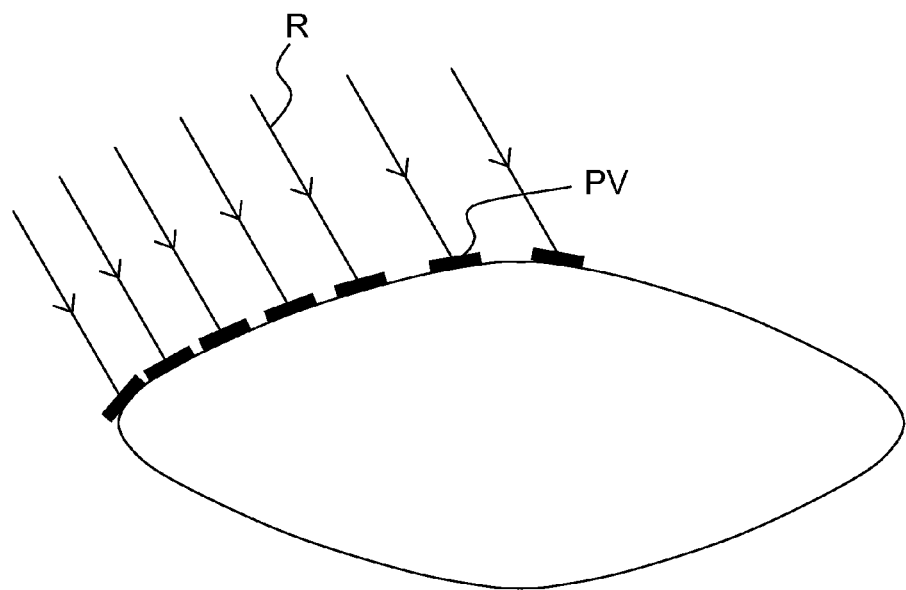
FIG. 1 illustrates a diagram of a stratospheric balloon according to the prior art.
Figure 2:
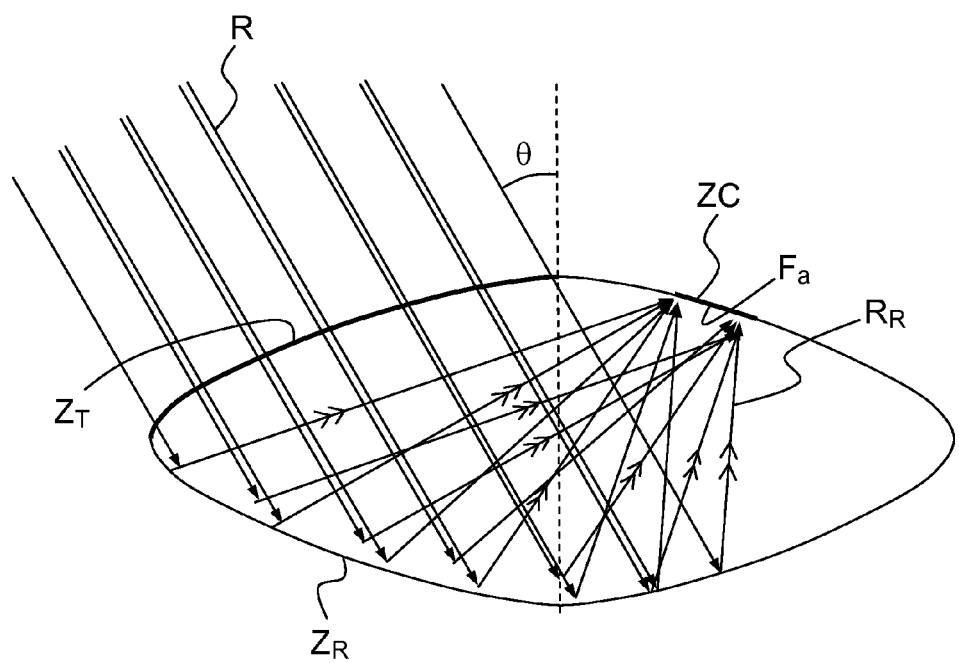
FIG. 2 schematically shows a balloon according to the present invention.

FIG. 2 thus schematically shows the balloon of the invention which exhibits an envelope. The envelope comprises a first zone ZT transparent to solar rays R, a second reflecting zone ZR for said solar rays and a third zone ZC comprising said photovoltaic cells, the active face Fa of which is directed toward the inside of said envelope. The second and third zones are positioned such that they cooperate to reflect the solar rays in the direction of said third zone. Moreover, the shape of the envelope also conditions the angle of flux of the reflected beam of solar rays $R_R$ in order to concentrate it onto the active surface of the photovoltaic cells.

The envelope can advantageously be made of reinforced complex polyurethane. To this end, there exist polyurethanes that are transparent to solar rays. Regarding the reflecting zone, provision can be made for a fabric coated with a reflecting coating and placed against said polyurethane envelope.

According to one variant of the invention, the photovoltaic cells are placed on the inside of the balloon and receive the concentrated solar rays directly. They can in this case be bonded onto the envelope. This configuration exhibits the benefit of ensuring a very good yield and provides for preventing a premature wear of the transparent envelope portion since the latter is not heated by the solar rays reflected and concentrated at this level of the envelope. According to this variant, provision can be made for cooling means coupled to said photovoltaic cells.

Figure 3:
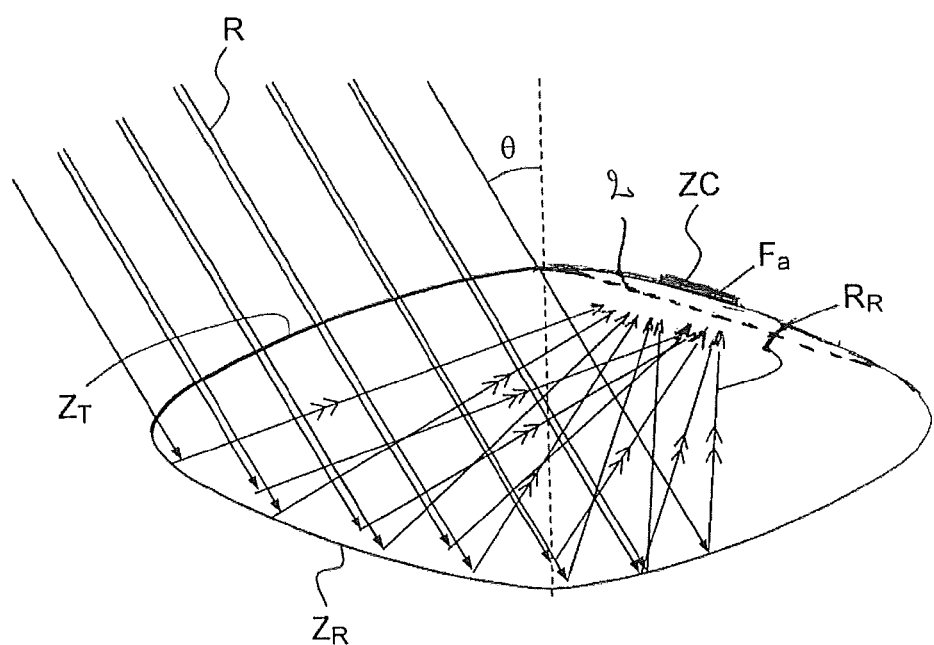
FIG. 3 illustrates a sub-envelope according to the present invention.

According to one variant of the invention, the photovoltaic cells are placed on the envelope on the outside of the balloon, the concentrated solar energy then passing through a transparent portion of the envelope other than the first zone dedicated to capturing solar rays. This arrangement favours the cooling of said photovoltaic cells since the heating of the photovoltaic cells takes place outside and thus benefits from natural ventilation. In this case, provision can advantageously be made for a second skin to protect the envelope insofar as the latter receives a concentrated beam of solar rays. Particular polyurethane films can be used for this purpose. The balloon may further include a sub-envelope 2 located at the third zone ZC, enabling the third zone ZC to be protected from the concentrated reflected radiation of solar rays, as illustrated in FIG. 3.

According to one variant of the invention, the photovoltaic cells are integrated with the envelope of the balloon. To this end, an opening is made in the envelope in which said photovoltaic cells are integrated. A joint is in this case used to provide the seal between the portion of the envelope formed by the photovoltaic cells and the other portions of the envelope.

Regardless of the variant used, the reflecting zone ZR of the envelope can take the shape of the envelope: in this case, the shape of the envelope is chosen so as to optimize both the lift of the balloon and the optical convergence of the solar rays toward the photovoltaic cells.

According to one variant of the invention, the envelope can comprise a first skin and a second skin comprising the reflecting zone ZR, so as to be able to have a shape that is different from that of the envelope. In this case, the shape of the envelope and that of the reflecting surface can be chosen independently. The shape of the envelope can be adapted to optimize lift, the shape of the reflecting surface being chosen for optical reasons only. In this case and advantageously, the reflecting zone can be deformable, so as to optimize its shape, also taking into account the angle of incidence of the solar rays. This angle can vary according to the time of day, season, altitude and geographic position of the balloon.

Generally, the shape of the envelope is preferably one of revolution. An ellipsoid shape for the envelope is suitable to provide satisfactory lift and optical performance, in particular if the reflecting surface is the same as that of the envelope. Alternatively, the envelope can be of parabolic shape.

The usual shapes of balloons, which can be spherical as well as parabolic, can be used, in particular if the shape of the reflecting zone is independent of the shape of the envelope.

The shape of the reflecting zone is preferably parabolic.

Generally, the configuration of the envelope leads to imparting to the reflecting zone which forms a part of it a capability of concentrating solar rays in the direction of the photovoltaic cells. The concentration factor can be adjustable; typically it can be greater than 1 and less than 5, varying with the time of day, since the angle θ of the solar rays varies with the time of day.

The geometric concentration of the sunshine thus provides for significantly reducing the surface area of photovoltaic cells and therefore the associated weight.

According to one variant, the stratospheric balloon can also comprise more than one reflecting zone, the various reflecting zones cooperating with each other and the active surface of the photovoltaic panels.

Example Stratospheric Balloon:

Taking into account the weight to load on board a stratospheric balloon for a given mission, a necessary volume of the envelope to be inflated with helium is defined for example, and the lift calculations condition the shape and therefore the appropriate surface of the balloon. The balloon exhibits a volume in the order of 50000 $m^3$ and a borne weight in the order of 4 tonnes; it comprises a parabolic shape envelope; a first part of the envelope is formed by complex polyurethane transparent to solar rays; a second part of the envelope, also of parabolic shape, comprises a reflecting coating; the third part of the envelope comprises a group of photovoltaic cells bonded on said envelope.

The invention claimed is:

1. A balloon comprising photovoltaic means exhibiting an active face configured to receive solar rays and comprising:
   an envelope having a first skin and a second skin, wherein:
   the first skin has a first zone transparent to solar rays,
   the second skin has a second zone reflecting said solar rays, and
   the first skin further has a third zone transparent to solar rays and positioned off-center of the first skin, the third zone supporting said photovoltaic means placed on an outside of the envelope, the active face of which is directed toward an inside of said envelope, and
   wherein:
   a shape of the first skin of the envelope and a shape of the second skin of the envelope having the second zone are different,
   the second and the third zones are positioned and cooperate to reflect and transmit the solar rays in a direction of the photovoltaic means, and
   the first zone, the second zone, and the third zone are disposed on outer walls of the balloon, the balloon being a buoyant body configured to float in an atmosphere.

2. The balloon according to claim 1, wherein the photovoltaic means are photovoltaic panels.

3. The balloon according to claim 1, further comprising:
   a first reflecting zone and a second reflecting zone, said first reflecting zone reflecting the solar rays in a direction of said second reflecting zone,
   said second reflecting zone and said third zone are positioned to cooperate to reflect the solar rays in the direction of said third zone.

4. The balloon according to claim 1, further comprising a sub-envelope comprising a third skin located interior of said third zone, the sub-envelope configured to protect the third skin from a concentrated reflected radiation of solar rays.

5. The balloon according to claim 1, wherein the second zone exhibits a parabolic surface.

6. The balloon according to claim 1, wherein the shape of the first skin of the envelope is optimized for lift and the shape of the second skin of the envelope is optimized for concentrating solar rays.

7. The balloon according to claim 1, wherein a volume of the balloon is 50,000 m$^3$.

* * * * *